United States Patent
Quinn et al.

(10) Patent No.: US 8,307,643 B2
(45) Date of Patent: Nov. 13, 2012

(54) INTERCOOLER HAVING CONDENSATE RESERVOIR

(75) Inventors: Richard D. Quinn, Clarkston, MI (US);
Brandon S. Helton, Hartland, MI (US);
Kenneth J. Murphy, Carleton, MI (US);
Tuan A Tran, Dearborn Heights, MI (US); Lawrence E. Walla, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 574 days.

(21) Appl. No.: 12/617,010

(22) Filed: Nov. 12, 2009

(65) Prior Publication Data

US 2011/0107760 A1    May 12, 2011

(51) Int. Cl.
*F02B 29/04* (2006.01)
(52) U.S. Cl. ........ 60/599; 60/309; 123/563; 123/568.12
(58) Field of Classification Search ............ 60/278, 60/309, 599; 123/41.09, 563, 568.12
See application file for complete search history.

(56) References Cited

U.S. PATENT DOCUMENTS

| | | | |
|---|---|---|---|
| 8,104,456 B2 * | 1/2012 | Yacoub | ............ 123/568.12 |
| 2009/0223493 A1 | 9/2009 | Rutherford | |

* cited by examiner

*Primary Examiner* — Ching Chang

(57) ABSTRACT

An engine air intake system for a vehicle having an internal combustion engine may include a turbocharger; a CAC heat exchanger having an inlet end for receiving compressed intake air from the turbocharger and an outlet end; a remote condensate reservoir spaced from the CAC heat exchanger, for storing condensate therein; a condensate drain tube extending from the outlet end to the remote condensate reservoir to allow condensate produced in the CAC heat exchanger to flow into the remote condensate reservoir; an air duct connecting the outlet end to the engine to direct air flow from the outlet end to the engine; and a reservoir outlet hose connected to the remote condensate reservoir at a first end and connected to the air duct at a second end to allow condensate evaporating from the remote condensate reservoir to flow through the reservoir outlet hose into the air duct.

11 Claims, 3 Drawing Sheets

INTERCOOLER HAVING CONDENSATE RESERVOIR

BACKGROUND OF INVENTION

The present invention relates generally to turbocharger systems used with internal combustion engines in vehicles, and more particularly to intercooler assemblies used with turbocharger systems in vehicles.

Many high output turbocharged engines used in vehicles employ a base boost at relatively low engine speeds, such as during steady state highway driving. This base boost is essentially an always-on turbo boost and helps reduce turbo lag, which is a common complaint for older turbocharged engines on vehicles. A high level of base boost, together with a high thermal efficiency charge-air-cooler (CAC) heat exchanger (i.e., an intercooler), can cause condensation to form inside the CAC. This condensation typically occurs during steady state driving when ambient conditions are warm with humidity levels near one hundred percent. Such a condition may occur for an automotive vehicle during steady state highway driving in the rain.

The concern with forming this condensation occurs when a significant amount of condensate has been generated during steady state driving, and the vehicle operator subsequently performs a hard acceleration of the vehicle. The collected condensate can be ingested into the engine at too high of a rate, causing engine misfire. If the misfire is severe enough, the vehicle's engine control module may light the "service engine soon" light, which is undesirable. Moreover, the driver may also notice poor vehicle performance or rough acceleration, which are also undesirable.

One way to minimize the condensate collection is by employing a turbocharger system that provides a very low base boost. However, this increases the undesirable turbo-lag that base boost is meant to minimize in the first place. Another possibility to deal with the condensate is to use engine vacuum to extract condensate, but this may create powertrain integration concerns. Also, another way is to allow the condensate to leak to atmosphere; however, this may be undesirable when attempting to meet certain vehicle emissions requirements.

Another possible solution is to create an integrated condensate trap, as is shown in FIG. 1. In this turbocharger system 10, a pair of integrated condensate trap tubes 12 are built into the bottom of an intercooler heat exchanger 14. As air passes from an inlet tube 16 at a first end of the heat exchanger 14 to an outlet tube 18 at a second end of the heat exchanger, excess condensate that is formed in the heat exchanger 14 is stored in the integral trap tubes 12. For example, for a vehicle traveling at steady state highway speeds during a rain storm, the condensate may be produced in the intercooler heat exchanger 14 at a rate of about two hundred milliliters of water per hour, but the engine may only be able to handle ingesting water at a rate of about sixty milliliters of water per hour from the intercooler heat exchanger before engine misfire is detected. Thus, with the condensate trap tubes 12, the vehicle may only be able to travel for a relatively limited time before the ingestion rate of the condensate is high enough to cause a misfire.

SUMMARY OF INVENTION

An embodiment contemplates an engine air intake system for a vehicle having an internal combustion engine. The engine air intake system may include a turbocharger; a charge-air-cooler (CAC) heat exchanger having an inlet end that receives compressed intake air from the turbocharger and an outlet end; a remote condensate reservoir spaced from the CAC heat exchanger that stores condensate; a condensate drain tube extending from the outlet end to the remote condensate reservoir to allow condensate produced in the CAC heat exchanger to flow into the remote condensate reservoir; an air duct connecting the outlet end to the engine to direct air flow from the outlet end to the engine; and a reservoir outlet hose connected to the top surface of the remote condensate reservoir at a first end and connected to the air duct at a second end to allow condensate evaporating from the remote condensate reservoir to be drawn through the reservoir outlet hose into the air duct.

An embodiment contemplates an engine air intake system for a vehicle having an internal combustion engine. The engine air intake system may include a turbocharger; a CAC heat exchanger having an inlet end for receiving compressed intake air from the turbocharger and an outlet end; a remote condensate reservoir spaced from the CAC heat exchanger, for storing condensate therein; a condensate drain tube extending from the outlet end to the remote condensate reservoir having a first end connected to the outlet end and a second end connected to the remote condensate reservoir at an elevation that is lower than the first end of the condensate drain tube to allow condensate produced in the CAC heat exchanger to flow into the remote condensate reservoir; an air duct connecting the outlet end to the engine to direct air flow from the outlet end to the engine; and a reservoir outlet hose connected to the remote condensate reservoir at a first end and connected to the air duct at a second end and configured to allow condensate evaporating from the remote condensate reservoir to flow through the reservoir outlet hose into the air duct.

An advantage of an embodiment is that a remote coolant reservoir allows for improved intercooler performance, especially when operating the vehicle in wet conditions. The condensate can be stored and fed into the engine in a controlled rate while still allowing for maximum charge-air-cooler heat exchanger effectiveness within the packaging space allowed for the heat exchanger by allowing for maximizing the frontal area in the CAC heat exchanger. Maximizing the frontal area in this way reduces the air flow restriction and reduces the pressure drop, which leads to the improved overall cooling of the charge air. This may allow for improved horsepower and torque output from the engine. Moreover, the remote coolant reservoir allows for more flexibility in the size and shape of the reservoir to provide the desired storage capacity for the condensate without reducing the cooling effectiveness of the charge air cooler heat exchanger and while providing more packaging flexibility in locating the reservoir.

Another advantage of an embodiment is that the remote condensate reservoir allows the vehicle to travel for longer periods of time without ingestion of condensate in the engine creating a significant engine misfire concern, even with an intercooled, high base boost turbocharger system. The ingestion of the condensate into the engine may be maintained at desired controlled rates, with the relatively higher pressure at a condensate drain tube and the relatively lower pressure at an intake duct connector causing a flow through the remote condensate reservoir that will draw condensate into the air stream.

Another advantage of an embodiment is that the condensate does not have to be released to atmosphere, thus avoiding concerns with vehicle emissions requirements.

Still another advantage of an embodiment is that the condensate reservoir, condensate drain tube and reservoir outlet hose do not require any moving parts, thus reducing concerns with reliability and making the assembly simple to fabricate and assemble and easy to service.

DETAILED DESCRIPTION

Figure 1:
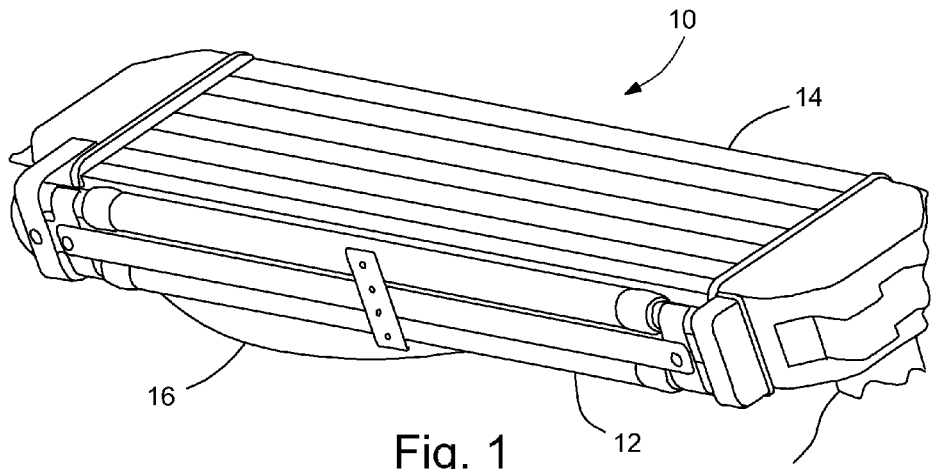
FIG. 1 is a perspective view of a prior art intercooler heat exchanger.
Figure 3:
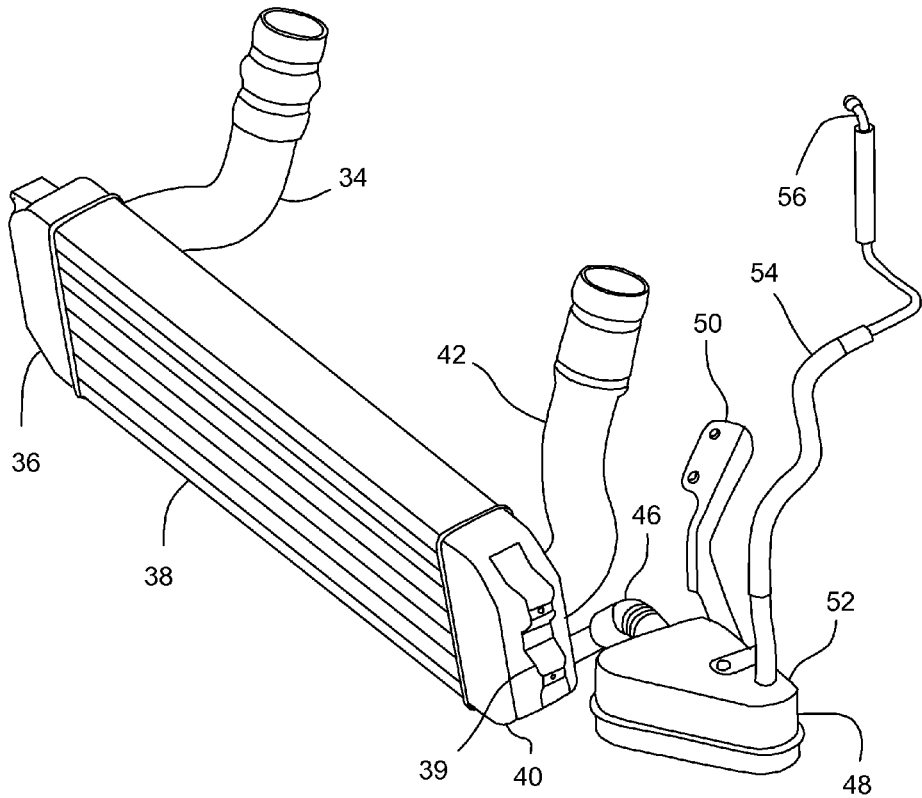
FIG. 3 is a perspective view of a portion of the turbocharger system.
Figure 2:
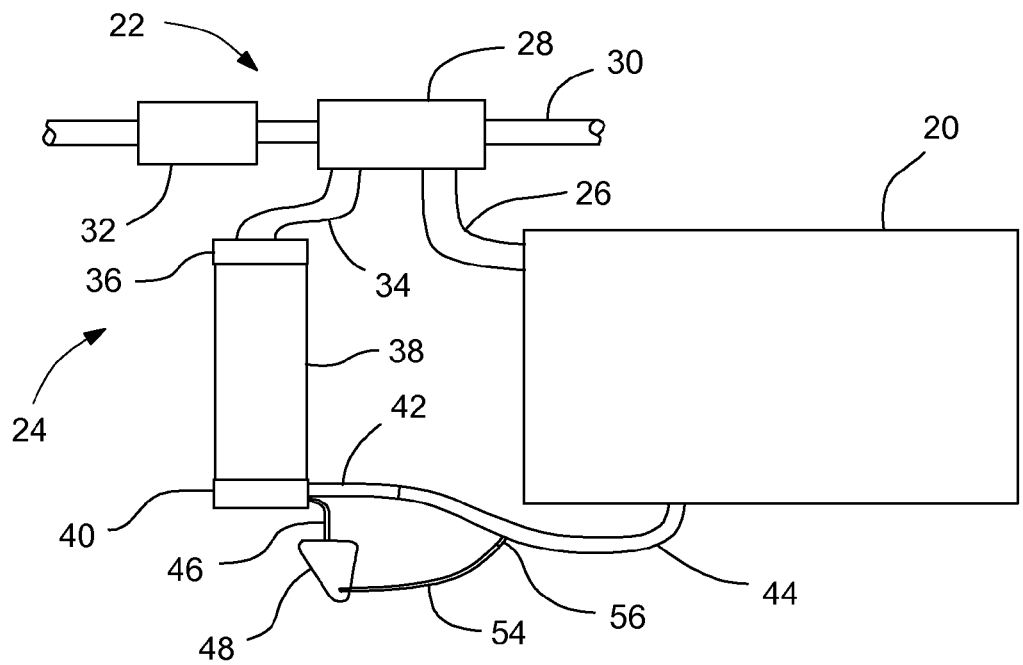
FIG. 2 is a schematic, plan view of an engine and turbocharger system for a vehicle.
Figure 4:
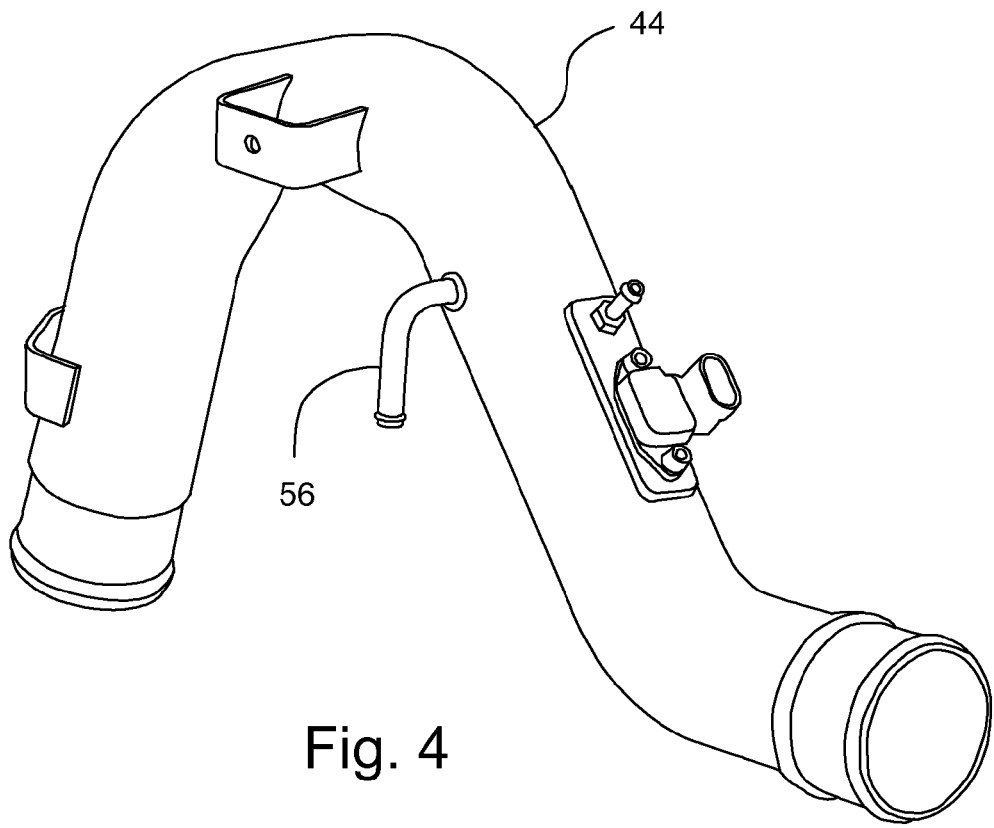
FIG. 4 is a perspective view of a portion of the turbocharger system.
Figure 5:
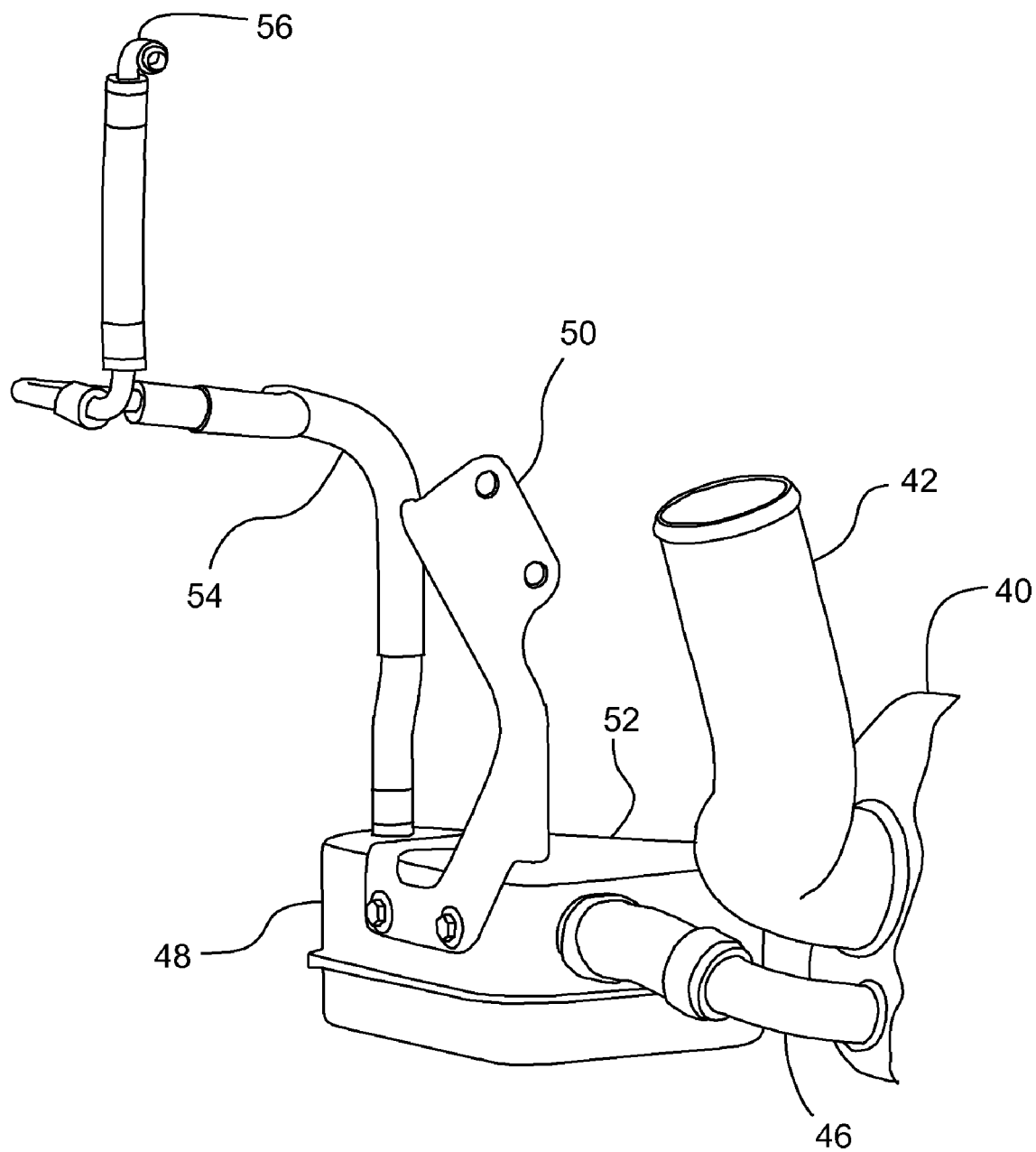
FIG. 5 is another perspective view of a portion of the turbocharger system.

FIGS. 2-5 illustrate portions of an engine 20 and engine air intake system 22 that is employed with a vehicle. The engine air intake system 22 includes a turbocharger system 24 that compresses and cools intake air before being delivered to the engine 20. The engine 20 connects to an exhaust pipe 26 leading to a turbocharger 28 that is driven by the flow of exhaust gas from the pipe 26. An exhaust outlet of the turbocharger 28 directs air into a vehicle exhaust pipe 30. Intake air is directed through an air cleaner 32 to the turbocharger 28, which directs the charged air into an intercooler inlet tube 34.

The intercooler inlet tube 34 directs compressed air into an intake end 36 of a charge-air-cooler (CAC) heat exchanger 38 that cools the charged air. The CAC heat exchanger 38 may include mounting brackets 39 for mounting the heat exchanger in a condenser, radiator, fan module. An outlet end 40 of the CAC heat exchanger 38 directs the compressed, cooled air into an intercooler air outlet tube 42, which is connected to and directs the air into an engine air intake duct 44. The engine air intake duct 44 directs the air into the engine 20.

The outlet end 40 also connects to a condensate drain tube 46 that leads to a remote condensate reservoir 48 that is spaced from the CAC heat exchanger 38. A support bracket 50 may mount to the reservoir 48 to vehicle body structure to support the reservoir 48 in the vehicle. The reservoir 48 is preferably packaged in the vehicle such that the condensate drain tube 46 is level or lower at the reservoir end than the end connected to the heat exchanger 38. Accordingly, the height the condensate has to travel up the drain tube 46 is minimized or eliminated. The condensate drain tube 46 should have a large enough inside diameter to allow condensate to easily flow from the heat exchanger 38 into the reservoir 48 under conditions that cause a high rate of condensate production, such as under a hard acceleration.

Extending from the top 52 of the reservoir 48 is a reservoir outlet hose 54. The reservoir outlet hose 54 connects to an intake duct connector 56, which is mounted to the engine air intake duct 44. The reservoir outlet hose 54 has a significantly smaller inner diameter than the engine air intake duct 44 in order to limit the amount of condensate relative to the volume of the air flowing into the engine 20. The significant size difference may be as much as an order of magnitude different, with the smaller diameter being one-tenth or less of the larger diameter, thus making the flow area difference even greater. The air flowing through the engine air intake duct 44 may possibly create somewhat of a venturi effect as it flows past the intake duct connector 56, thus drawing the air and condensate mixture from the reservoir outlet hose 54. The difference in pressure between the air in the condensate drain tube 46 and the air in the intake duct connector 56 will cause an air flow through the remote condensate reservoir 48, which will draw some of the condensate into the air stream. Consequently, this reservoir assembly is an active system that operates continuously as the engine is on—rather than a passive system—assuring that the condensate will be drawn into the engine at a desirable controlled rate.

Portions of the condensate drain tube 46 and reservoir outlet hose 54 are preferably made of silicone. The silicone material is preferred in order to avoid swelling and cracking from exposure to oil from the turbocharger unit that may occur with other materials. The silicone also provides the ability to expand should the condensate freeze in cold weather.

During operation of the vehicle in high humidity conditions, such as driving on a highway during a rain storm, condensate that forms in the CAC heat exchanger 38 and collects at the bottom of the heat exchanger 38 is drawn into the remote condensate reservoir 48 through the condensate drain tube 46. The reservoir outlet hose 54 is attached to the top 52 of the reservoir 48, which allows the incoming mix of condensate and air to separate. The excess condensate produced while driving under the high humidity conditions will be stored in the reservoir 48.

Then, when the vehicle is operated under driving conditions with lower humidity, the condensate evaporates into the air flowing through the remote condensate reservoir 48, with this air drawn from the reservoir 48 through the reservoir outlet hose 54 into the engine air intake duct 44 and into the engine 20. The vacuum in the engine air intake duct 44 may possibly employ a venturi effect to draw the air/condensate mixture through the reservoir outlet hose 54. The inside diameter of the reservoir outlet hose 54, being much smaller than the inside diameter of the engine air intake duct 44 assures that the amount of condensate in the incoming air to the engine 20 will minimize the chance of the condensate causing an engine misfire. The particular difference in diameters may be determined for particular combinations of specific engines and turbocharger systems to assure that the condensate is ingested at a controlled rate below that which may cause misfires. The intake duct connector 56 connects to the engine air intake duct 44 close to the intake of the engine 20 to take advantage of the pressure differential in order to draw the evaporated condensate through the reservoir outlet hose 54.

While certain embodiments of the present invention have been described in detail, those familiar with the art to which this invention relates will recognize various alternative designs and embodiments for practicing the invention as defined by the following claims.

What is claimed is:

1. An engine air intake system for a vehicle having an internal combustion engine comprising:
   a turbocharger;
   a CAC heat exchanger having an inlet end configured to receive compressed intake air from the turbocharger and an outlet end;
   a remote condensate reservoir mounted in the vehicle spaced from the CAC heat exchanger, configured to store condensate therein, and having a top surface;
   a condensate drain tube extending from the outlet end to the remote condensate reservoir configured to allow condensate produced in the CAC heat exchanger to flow into the remote condensate reservoir;
   an air duct connecting the outlet end to the engine and configured to direct air flow from the outlet end to the engine; and a reservoir outlet hose connected to the top surface of the remote condensate reservoir at a first end and connected to the air duct at a second end and configured to allow condensate evaporating from the remote condensate reservoir to be drawn through the reservoir outlet hose into the air duct.

2. The engine air intake system of claim 1 wherein the condensate drain tube has a first end connected to the outlet end and a second end connected to the remote condensate reservoir at an elevation that is lower than the first end of the condensate drain tube.

3. The engine air intake system of claim 1 wherein the reservoir outlet hose has an inside diameter that is at least an order of magnitude smaller than an inside diameter of the air duct.

4. The engine air intake system of claim 1 wherein at least a portion of the condensate drain tube is made of silicone.

5. The engine air intake system of claim 1 wherein at least a portion of the reservoir outlet hose is made of silicone.

6. The engine air intake system of claim 1 wherein the condensate drain tube connects to a side of the remote condensate reservoir at an elevation below the top surface of the remote condensate reservoir.

7. An engine air intake system for a vehicle having an internal combustion engine comprising:
   a turbocharger;
   a CAC heat exchanger having an inlet end configured to receive compressed intake air from the turbocharger and an outlet end;
   a remote condensate reservoir spaced from the CAC heat exchanger, configured to store condensate therein;
   a condensate drain tube extending from the outlet end to the remote condensate reservoir having a first end connected to the outlet end and a second end connected to the remote condensate reservoir at an elevation that is lower than the first end of the condensate drain tube to allow condensate produced in the CAC heat exchanger to flow into the remote condensate reservoir;
   an air duct connecting the outlet end to the engine and configured to direct air flow from the outlet end to the engine; and
   a reservoir outlet hose connected to the remote condensate reservoir at a first end and connected to the air duct at a second end and configured to allow condensate evaporating from the remote condensate reservoir to flow through the reservoir outlet hose into the air duct.

8. The engine air intake system of claim 7 wherein the reservoir outlet hose has an inside diameter that is at least an order of magnitude smaller than an inside diameter of the air duct.

9. The engine air intake system of claim 8 wherein the remote condensate reservoir has a top surface and the first end of the reservoir outlet hose is connected to the top surface of the remote condensate reservoir.

10. The engine air intake system of claim 9 wherein the condensate drain tube connects to a side of the remote condensate reservoir at an elevation below the top surface of the remote condensate reservoir.

11. The engine air intake system of claim 7 including a pair of heat exchanger brackets secured to the CAC heat exchanger and configured to mount the CAC heat exchanger to vehicle structure, and a reservoir bracket secured to the remote condensate reservoir and configured to secure a remote condensate bracket to the vehicle structure.

* * * * *